(12) United States Patent
Kuboki et al.

(10) Patent No.: US 11,322,784 B2
(45) Date of Patent: May 3, 2022

(54) COOLING MEMBER AND POWER STORAGE MODULE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Hideyuki Kuboki, Yokkaichi (JP); Hiroki Hirai, Yokkaichi (JP); Makoto Higashikozono, Yokkaichi (JP); Akihisa Hosoe, Osaka (JP); Tomoharu Takeyama, Osaka (JP); Yoshiyuki Hirose, Osaka (JP)

(73) Assignees: AUTONETWORKS TECHNOLOGIES, LTD., Yokkaichi (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 658 days.

(21) Appl. No.: 15/776,211

(22) PCT Filed: Dec. 1, 2016

(86) PCT No.: PCT/JP2016/085681
§ 371 (c)(1),
(2) Date: May 15, 2018

(87) PCT Pub. No.: WO2017/094819
PCT Pub. Date: Jun. 8, 2017

(65) Prior Publication Data
US 2020/0251790 A1    Aug. 6, 2020

(30) Foreign Application Priority Data

Dec. 2, 2015 (JP) .............................. JP2015-235679

(51) Int. Cl.
*H01M 10/613* (2014.01)
*H01M 10/653* (2014.01)
(Continued)

(52) U.S. Cl.
CPC ....... *H01M 10/613* (2015.04); *H01M 10/653* (2015.04); *H01M 10/6567* (2015.04); *H01M 10/6569* (2015.04)

(58) Field of Classification Search
CPC ..... H01M 10/60–6569; H01M 10/653; H01M 10/6567
(Continued)

(56) References Cited

U.S. PATENT DOCUMENTS

| 7,124,810 B2 * | 10/2006 | Lee ....................... F28D 15/046 165/104.26 |
| 7,771,865 B2 * | 8/2010 | Takasaki ............. H01M 10/625 429/83 |

(Continued)

FOREIGN PATENT DOCUMENTS

| CN | 202616368 U | 12/2012 |
| CN | 103069611 A | 4/2013 |

(Continued)

OTHER PUBLICATIONS

International Search Report for Application No. PCT/JP2016/085681 dated Feb. 14, 2017; 7 pages.
(Continued)

*Primary Examiner* — Cynthia H Kelly
*Assistant Examiner* — Niara Trant
(74) *Attorney, Agent, or Firm* — Reising Ethington, P.C.

(57) ABSTRACT

A cooling member includes refrigerant, an absorbing member absorbing the refrigerant, an enclosing member including flexible sheet members, that are connected to each other and enclosing the refrigerant and the absorbing member in
(Continued)

a sealed state, and a heat releasing section configured to receive heat from the enclosing member and release the heat to an outside.

20 Claims, 18 Drawing Sheets

(51) Int. Cl.
    *H01M 10/6567* (2014.01)
    *H01M 10/6569* (2014.01)

(58) Field of Classification Search
    USPC .......................................................... 429/62
    See application file for complete search history.

(56) References Cited

U.S. PATENT DOCUMENTS

| | | |
|---|---|---|
| 9,196,938 B2 | 11/2015 | Yoon |
| 2012/0009455 A1 | 1/2012 | Yoon |
| 2013/0130087 A1 | 5/2013 | Kawaguchi et al. |
| 2014/0318746 A1* | 10/2014 | Kwak .................. H01M 10/613 165/104.33 |
| 2017/0092999 A1* | 3/2017 | Tarlau ................ H01M 10/6569 |

FOREIGN PATENT DOCUMENTS

| | | |
|---|---|---|
| JP | H1123169 A | 1/1999 |
| JP | 2005147637 A | 6/2005 |
| JP | 2012018915 A | 1/2012 |
| JP | 2012115589 A | 6/2012 |
| JP | 2012248363 A | 12/2012 |
| JP | 2013131428 A | 7/2013 |

OTHER PUBLICATIONS

English Translation of International Preliminary Report on Patentability for Application No. PCT/JP2016/08561 dated Jul. 13, 2017; 9 pages.

International Preliminary Report on Patentability for Application No. PCT/JP2016/08561 dated Jul. 13, 2017; 9 pages.

\* cited by examiner

COOLING MEMBER AND POWER STORAGE MODULE

CROSS REFERENCE TO RELATED APPLICATIONS

This application claims the priority of Japanese patent application JP2015-235679 filed on Dec. 2, 2015, the entire contents of which are incorporated herein.

TECHNICAL FIELD

The present technology relates to a cooling member and a power storage module.

BACKGROUND ART

A heat pipe described in Patent Document 1 has been known. Such a heat pipe includes a pipe made of metal and heat transfer fluid filled in the heat pipe in a fluid tight manner.

[Patent Document 1] Japanese Unexamined Patent Application Publication No. 11-23169

SUMMARY

According to the above structure, the pipe needs to be strong to seal the heat transfer fluid therein because the heat transfer fluid that receives heat from a heating element is evaporated and increases its volume and pressure within the pipe is increased. If the pipe that is relatively strong and encloses the heat transfer fluid therein in a fluid tight manner is used, a manufacturing cost may be increased.

The present technology described in this specification has been completed in view of the circumstances described above. It is an object of the present technology to reduce a manufacturing cost of a cooling member.

A cooling member according to the description in this specification includes refrigerant, an absorbing member absorbing the refrigerant, an enclosing member including flexible sheet members that are connected to each other and configured to enclose the refrigerant and the absorbing member in a sealed state, and a heat releasing section configured to receive heat from the enclosing member and release the heat to an outside.

According to such a configuration, the pressure inside the enclosing member is increased by the evaporation of the refrigerant. Then, the flexible sheet members are deformed to increase the volume of the enclosing member and the pressure within the enclosing member is lowered. Accordingly, pressure resistance of the enclosing member can be lowered compared to the cooling member of a metal container that does not change its volume. Therefore, a manufacturing cost of the cooling member is reduced. The heat of the enclosing member is released outside via the heat releasing section, and the heat releasing properties can be improved.

Following configurations may be preferable for embodiments of the technology described in this specification.

The heat releasing section may include a recessed section in which an end portion of the enclosing member is inserted.

According to such a configuration, inner wall surfaces of the recessed section of the heat releasing section are opposite outer surfaces of the end portion of the enclosing member such that an area of the heat releasing section receiving the heat from the enclosing member is increased. This improves heat releasing properties.

The heat releasing section may release heat to an outside via circulation of gas or fluid.

Accordingly, the heat releasing properties of the heat releasing section can be improved.

A power storage module may include the cooling member and a power storage element having an outer surface, and at least a part of the outer surface may be in contact with the cooling member.

According to such a configuration, heat of the power storage element can be released via the heat releasing section.

The power storage module may further include a casing in which the power storage element is arranged and having an inner surface that is in contact with the outer surface of the power storage element, and the heat releasing section may be included in the casing.

According to such a configuration, heat of the power storage element can be released via the casing.

The power storage module may further include a pair of holding plates that hold the power storage element therebetween while being in contact with the outer surface of the power storage element, and the pair of holding plates may be in contact with the heat releasing section.

According to such a configuration, heat of the power storage element can be released via the holding plates.

According to the present technology, a manufacturing cost of a cooling member is reduced.

DESCRIPTION

First Embodiment

One embodiment will be described with reference to FIGS. 1 to 12.

Figure 7:
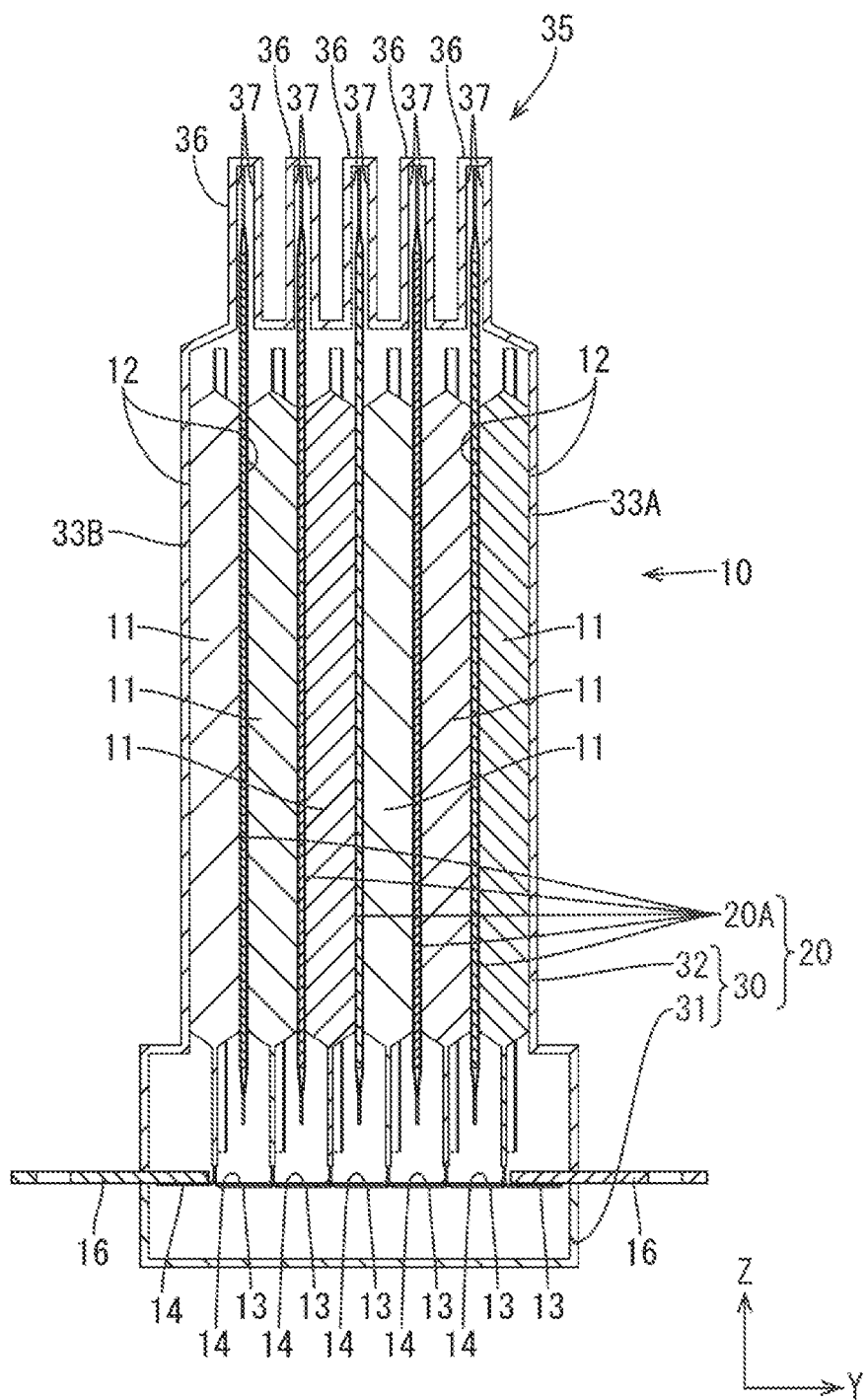
FIG. 7 is a cross-sectional view taken along line C-C in FIG. 3.
Figure 8:
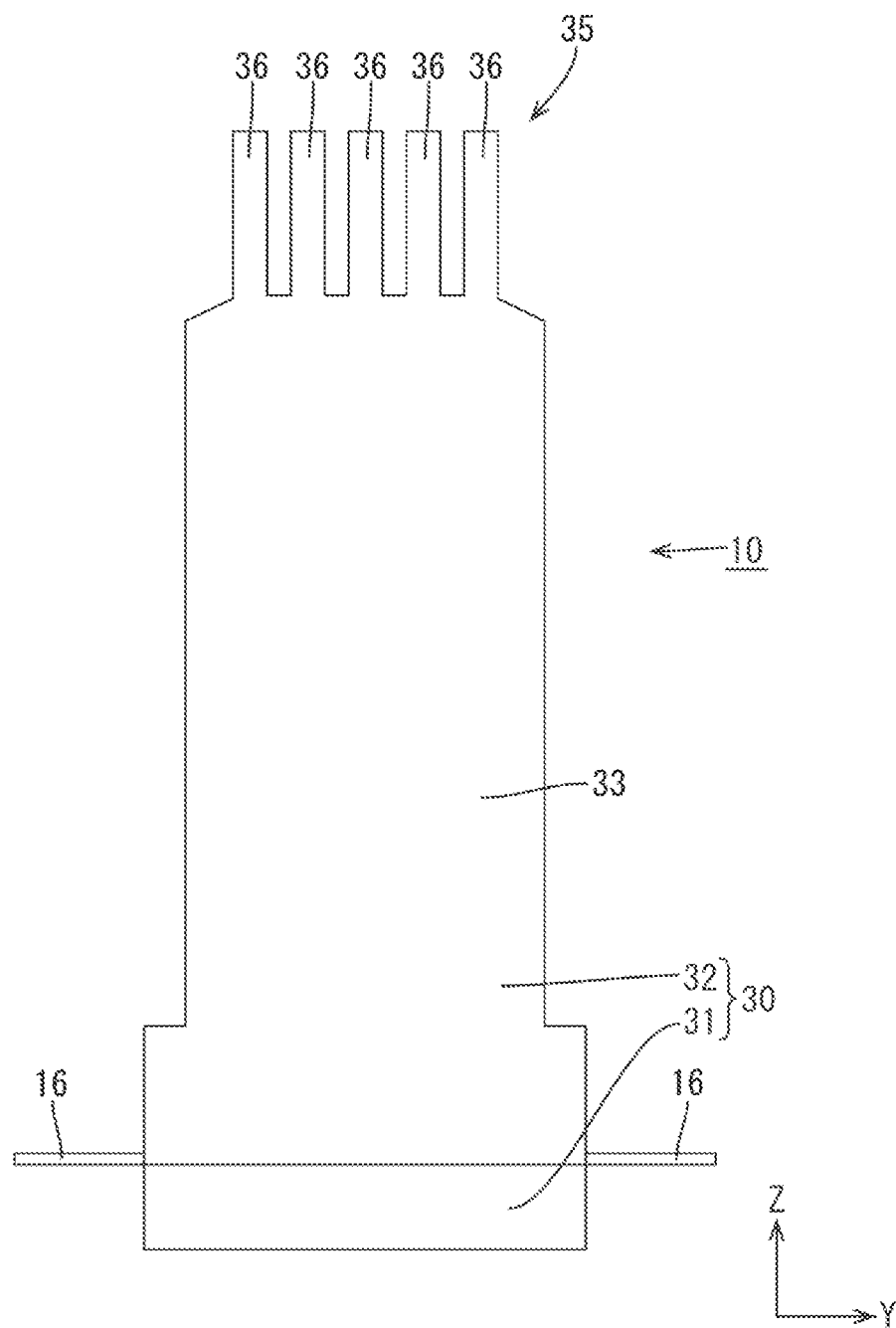
FIG. 8 is a side view illustrating the power storage module.

As illustrated in FIG. 7, a power storage module 10 according to this embodiment includes power storage elements 11 (six in this embodiment) and a cooling member 20 that cools the power storage elements 11. In following description, an X direction represents a front side and a Z direction represents an upper side.

The power storage elements 11 are arranged in a row along a small thickness direction of the power storage element 11. Each of the power storage elements 11 includes a pair of laminating sheets 12 and a power storage component that is disposed between the laminating sheets 12, and end sections of the laminating sheets 12 are bonded in a liquid tight manner with a known method such as heat-welding. Positive terminals 13 and negative terminals 14 that are formed from a thin metal foil extend from a lower end of each power storage element 11 while being in contact with inner surfaces of the laminating sheets 12 in a liquid tight manner. The positive terminal 13 and the negative terminal 14 extend from an inside to an outside of the laminating sheet 12. The positive terminals 13 and the negative terminals 14 are electrically connected to the power storage components inside the power storage elements 11, respectively.

The adjacent power storage elements 11 are arranged in an opposite oriented manner. The positive terminal 13 and the negative terminal 14 of the adjacent storage elements 11 are bent to be closer to each other and ovelapped with each other and the overlapped positive terminal 13 and negative terminal 14 are electrically connected to each other with a known method such as laser welding, ultrasonic welding, and brazing. Thus, the power storage elements 11 are connected in series.

In this embodiment, secondary batteries such as lithium ion secondary batteries and nickel hydride batteries or capacitors such as electric double layer capacitors and lithium ion capacitors may be used as the power storage elements 11, and any power storage elements 11 can be used as appropriate. Ends of the positive terminals 13 and the negative terminals 14 that are connected in series are connected to power terminals 16 that are formed from a metal plate with a known method such as laser welding, ultrasonic welding, and brazing.

The cooling member 20 includes heat transfer packs 20A (five in this embodiment) and a casing 30. The heat transfer packs 20A receive heat from the power storage elements 11 and the casing 30 includes a heat releasing section 35 that receives the heat from the heat transfer packs 20A and releases the heat outside the casing 30.

Figure 12:
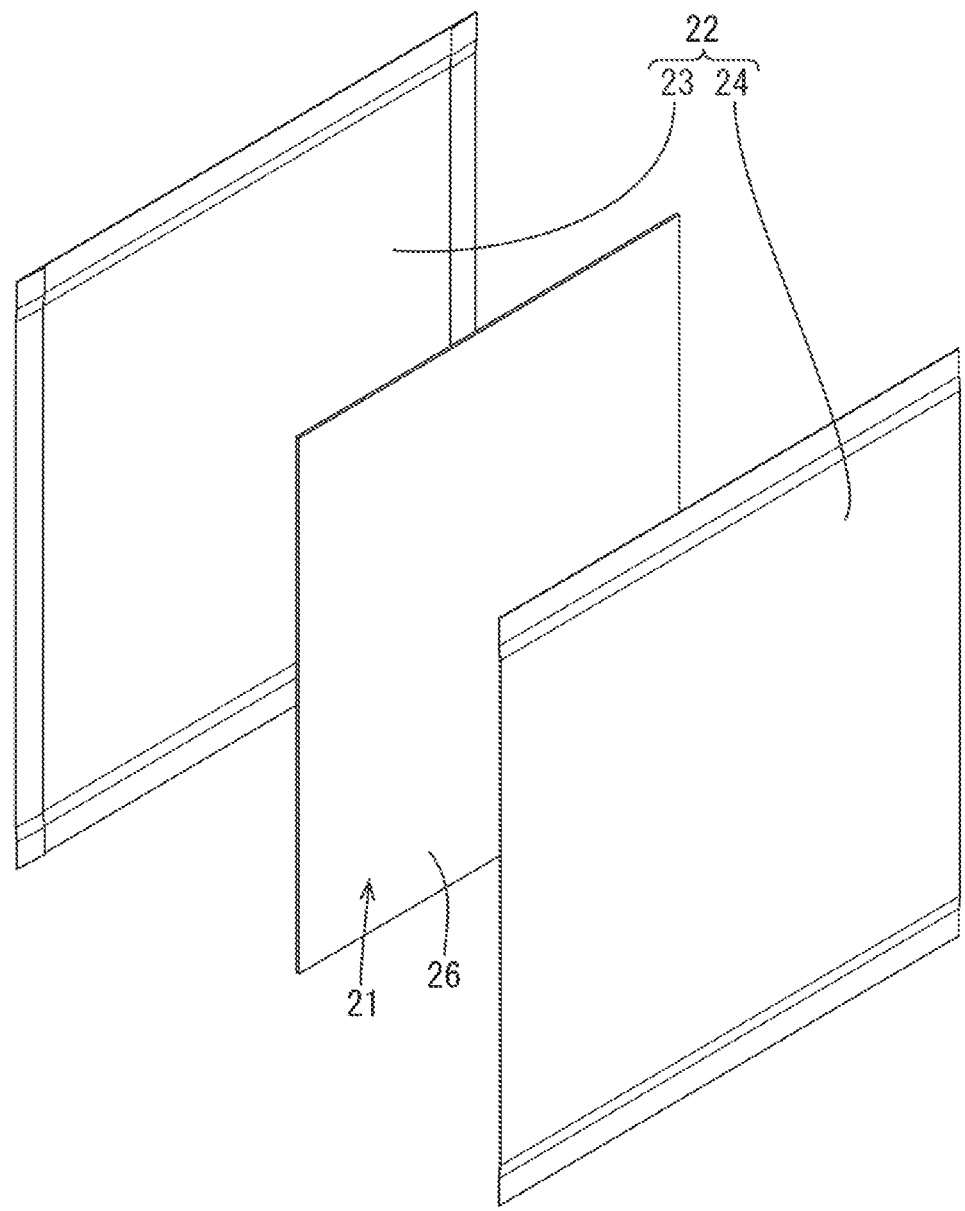
FIG. 12 is an exploded perspective view of the heat transfer pack.

The heat transfer packs 20A have a same configuration and each of the heat transfer packs 20A is between the adjacent power storage elements 11 while being closely in contact with each other. As illustrated in FIG. 12, the heat transfer pack 20A includes refrigerant 21 that changes between fluid and gas, an enclosing member 22 that is formed in a liquid tight manner and the refrigerant 21 is enclosed inside the enclosing member 22, and an absorbing member 26 that is disposed inside the enclosing member 22 and absorbs the refrigerant 21. The power storage elements 11 and the heat transfer packs 20A that are disposed between the adjacent power storage elements 11 configure a power storage element group 10A (see FIG. 9).

One or some may be selected from a group of perfluorocarbon, hydrofluoroether, hydrofluoroketone, fluorine inert liquid, water, and alcohol such as methanol and ethanol and can be used as the refrigerant 21. The refrigerant 21 may have an insulating property or may have conductivity.

As illustrated in FIG. 12, the enclosing member 22 includes two sheet members 23, 24 having a substantially rectangular shape and the the two sheet members 23, 24 are connected to each other in a liquid tight manner with a known method such as bonding, deposition, or welding. Each of the sheet members 23, 24 includes a metal sheet and synthetic resin films on both surfaces of the metal sheet. Any metal such as aluminum, aluminu alloy, copper, or copper alloy may be selected as appropriate as the metal of the metal sheet. Any synthetic resin such as polyorefin such as polyethylene and polypropylene, polyester such as polybutylene terephthalate, and polyamide such as nylon 6 and nylon 6, 6 may be selected as appropriate as the synthetic resin of the synthetic resin film.

Figure 1:
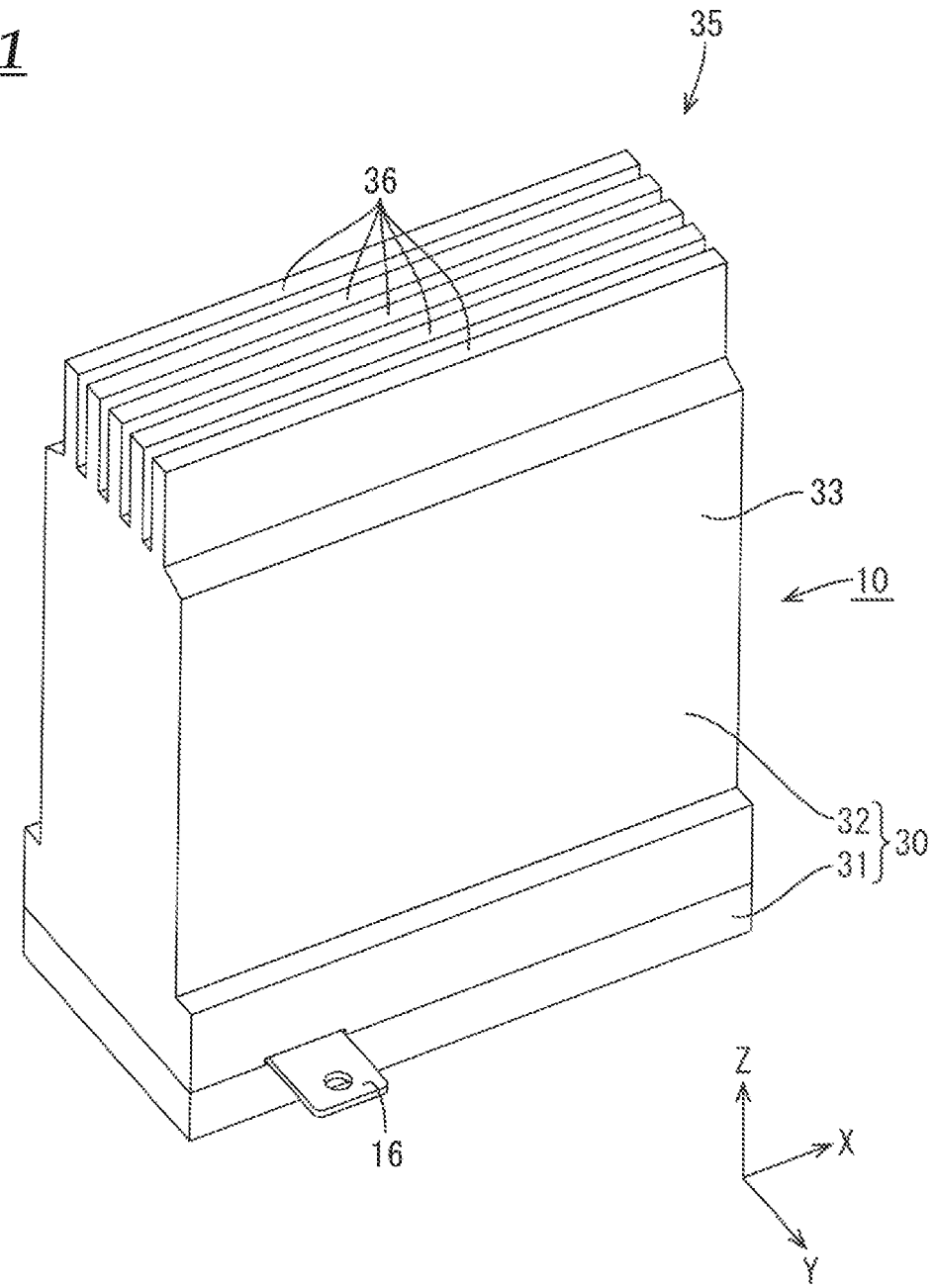
FIG. 1 is a perspective view illustrating a power storage module according to a first embodiment.
Figure 2:
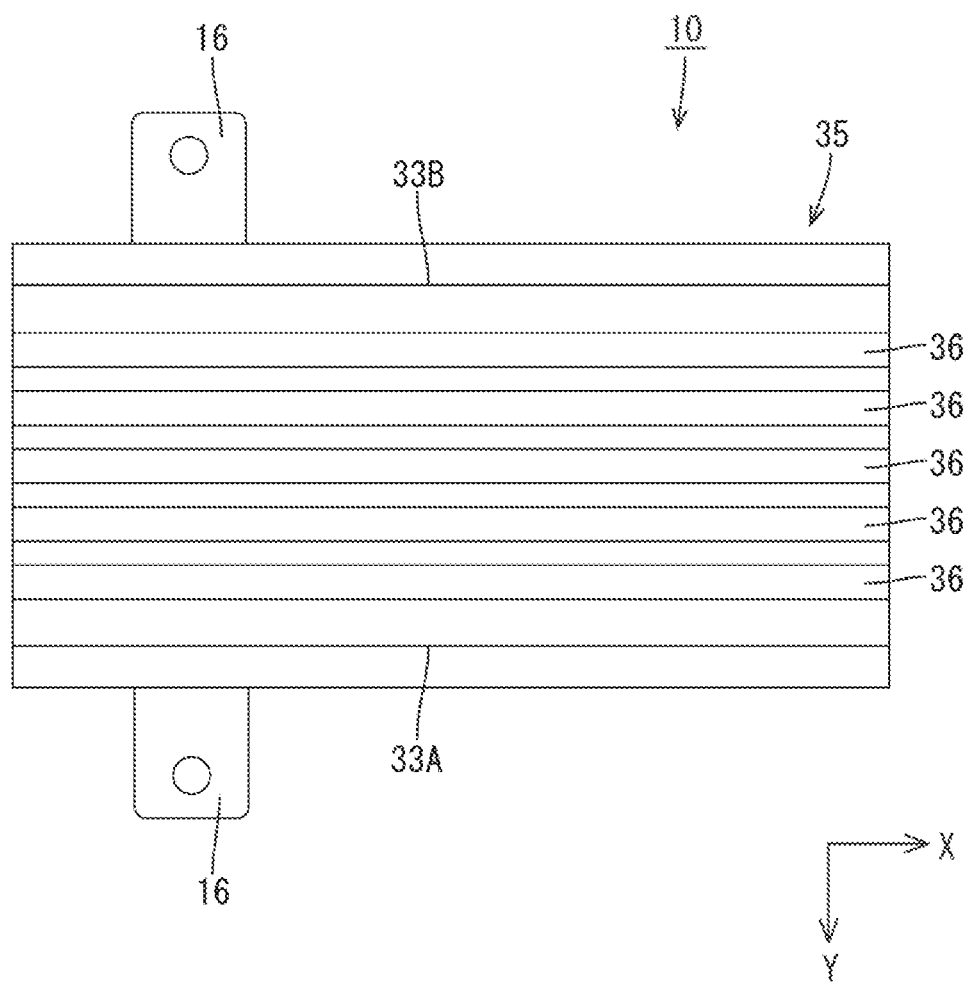
FIG. 2 is a plan view illustrating the power storage module.
Figure 3:
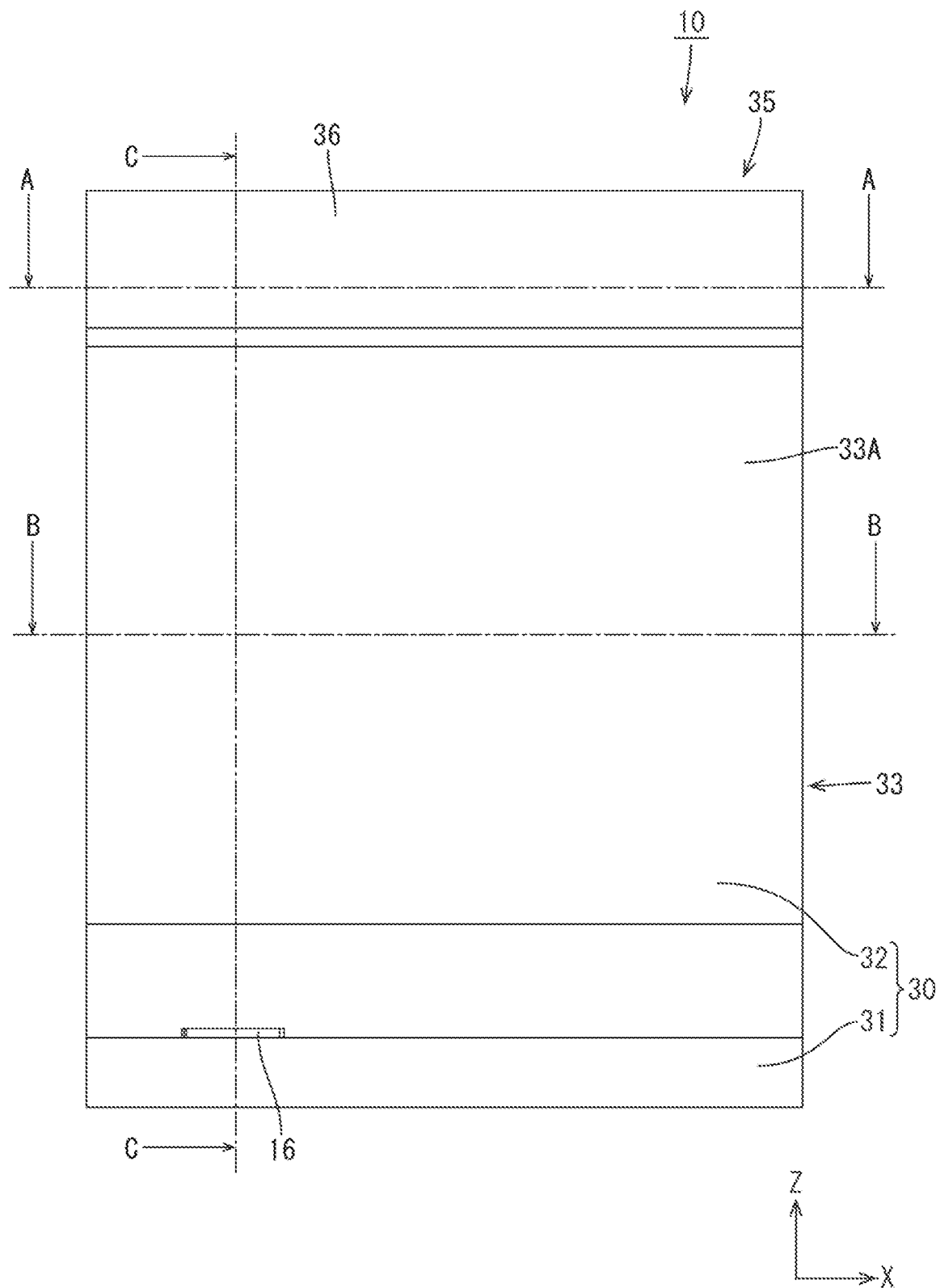
FIG. 3 is a front view illustrating the power storage module.
Figure 4:
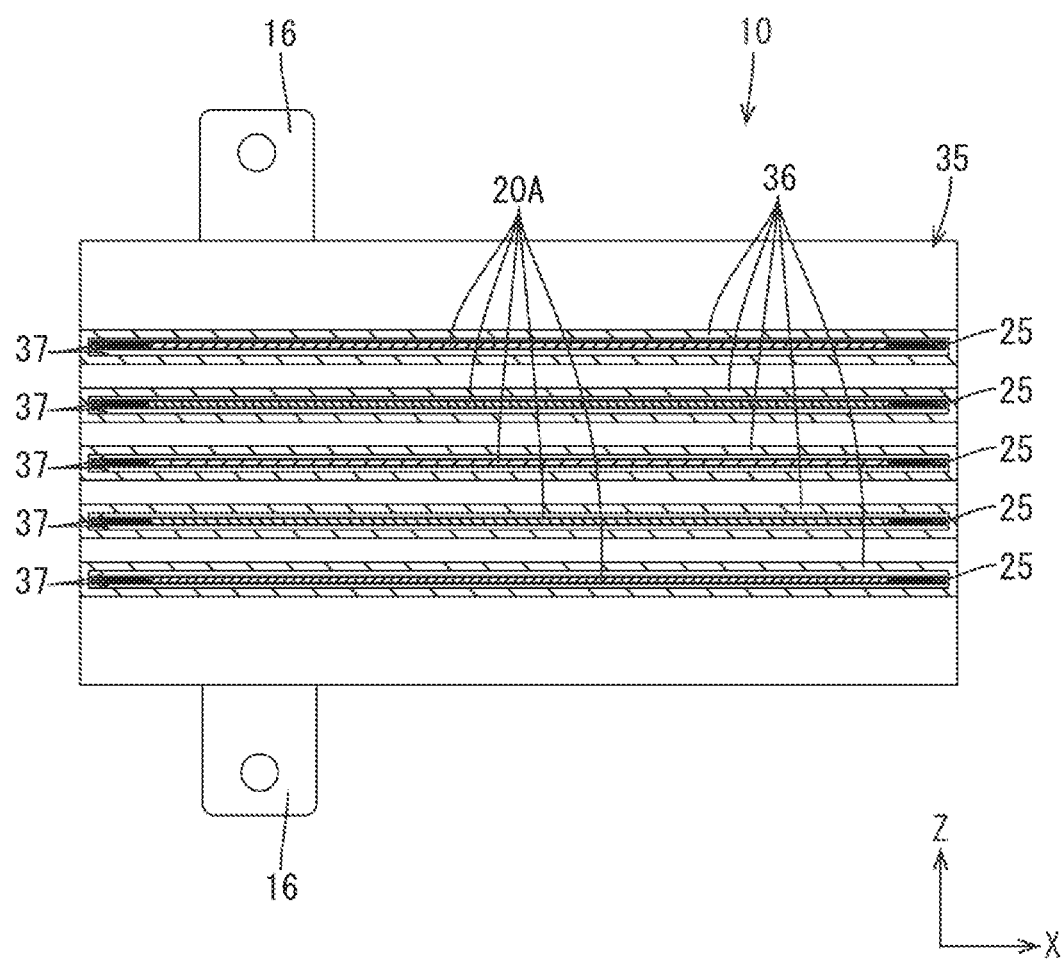
FIG. 4 is a cross-sectional view taken along line A-A in FIG. 3.
Figure 5:
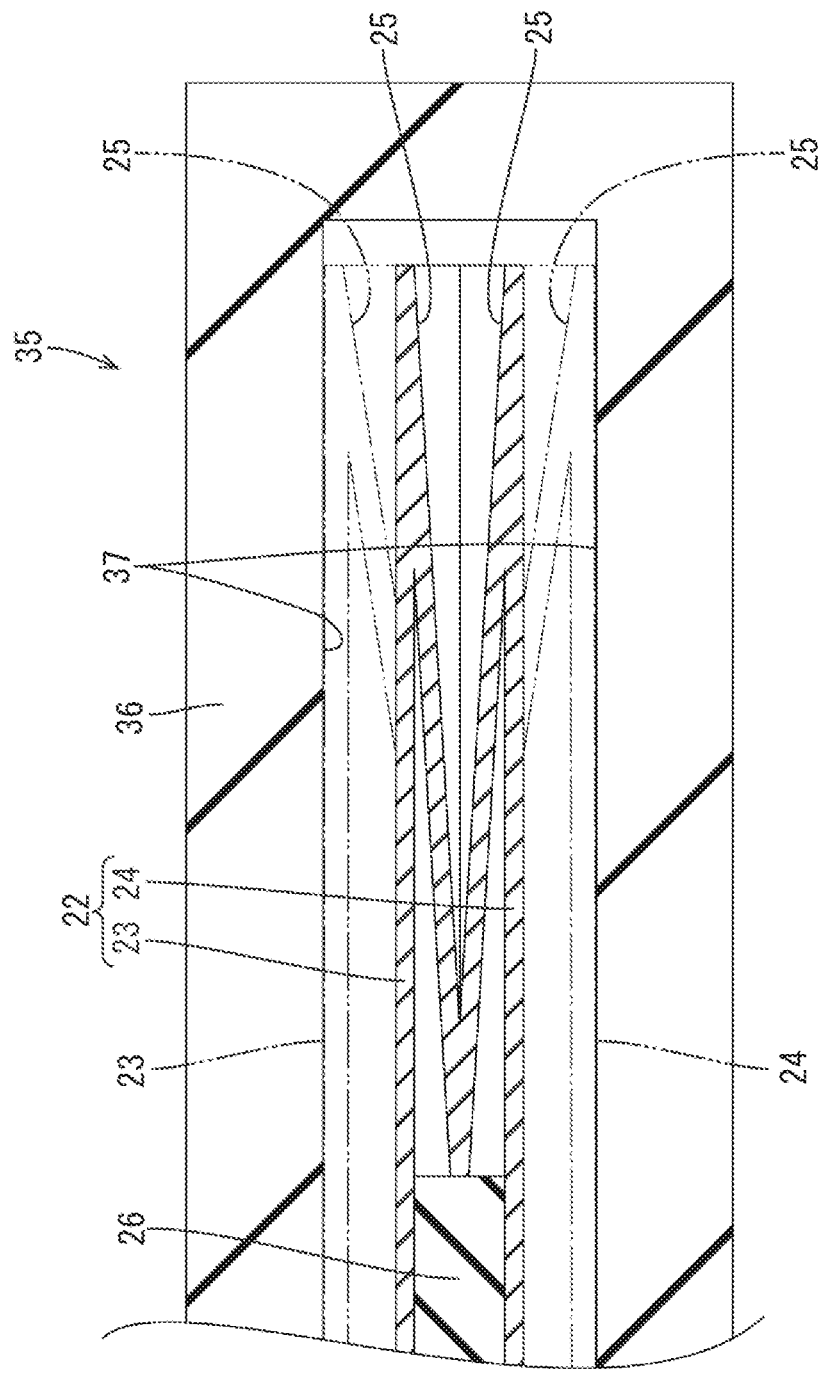
FIG. 5 is an enlarged view illustrating a part of FIG. 4.
Figure 6:
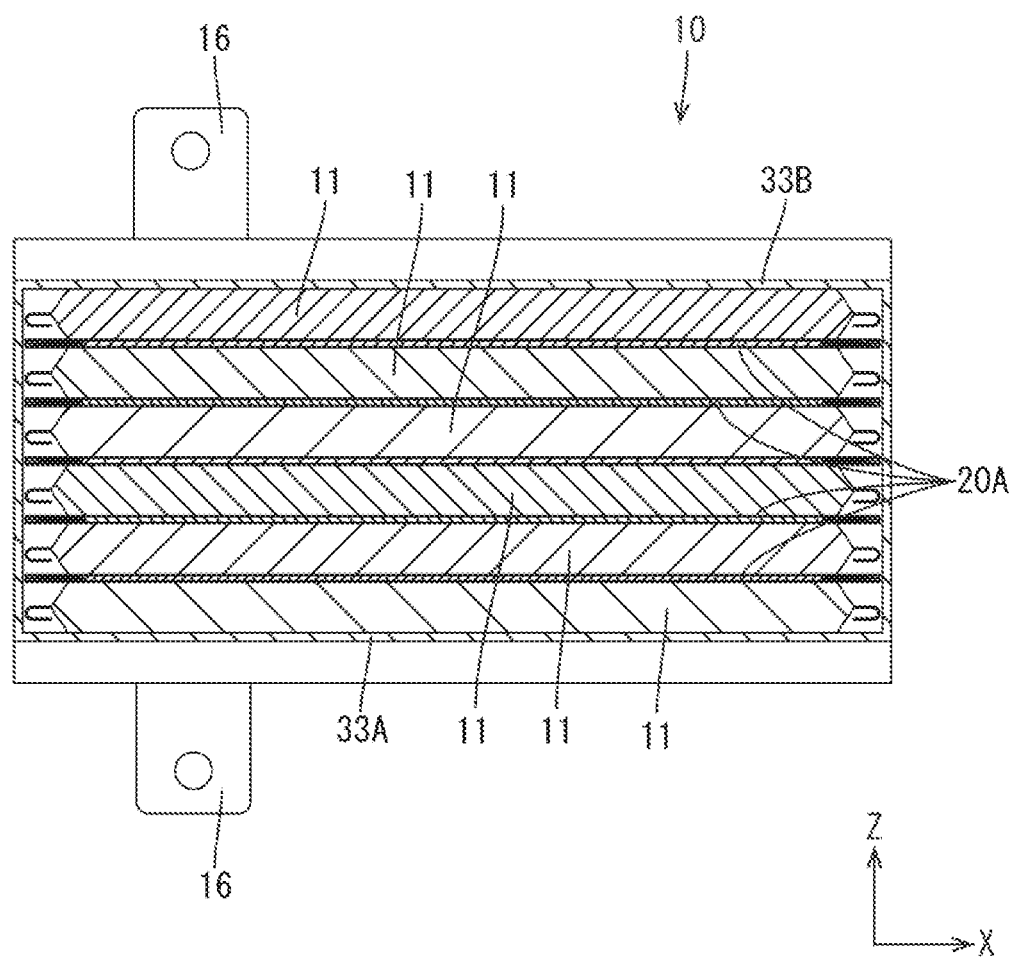
FIG. 6 is a cross-sectional view taken along line B-B in FIG. 3.

As illustrated in FIG. 5, the sheet members 23, 24 include spread sections 25 at right and left side two ends thereof. The spread section 25 is deformed to increase a distance between the sheet members 23, 24 if pressure inside the enclosing member 23 is increased. The spread section 25 is bent inside the enclosing member 22 while the sheet members 23, 24 are connected to each other. If the refrigerant 21 is evaporated and made into gas, the spread section 25 is deformed to spread such that outer surfaces of the sheet members 23, 24 are contacted with inner wall surfaces of a recessed section 37 formed inside the heat releasing section 35. The outer surfaces of the sheet members 23, 24 are contacted with the inner wall surfaces of the recessed section 37 in a surface-contact state (along a substantially same plane surface, see a broken line in FIG. 5). Accordingly, the distance between the sheet members 23, 24 is increased and a volume of the enclosing member 22 is increased so that the inner pressure of the enclosing member 22 is reduced. Therefore, required physical strength of the enclosing member 22 can be lowered compared to the pipe and no problem is caused.

As illustrated in FIG. 12, the absorbing member 26 that is configured to absorb the refrigerant 21 is included inside the enclosing member 22. The absorbing member 26 is formed from a substantially rectangular sheet. The absorbing member 26 is made of material that can absorb the refrigerant 21 and may be made of a cloth of fibers or a non-woven cloth. Examples of the non-woven cloth may include a fiber sheet, web (a thin film sheet made of only fibers), and batt (fibers of blanket). The material of the absorbing member 26 may be natural fibers or synthetic fibers made of synthetic resin or may include both of the natural fibers and the synthetic fibers.

Figure 9:
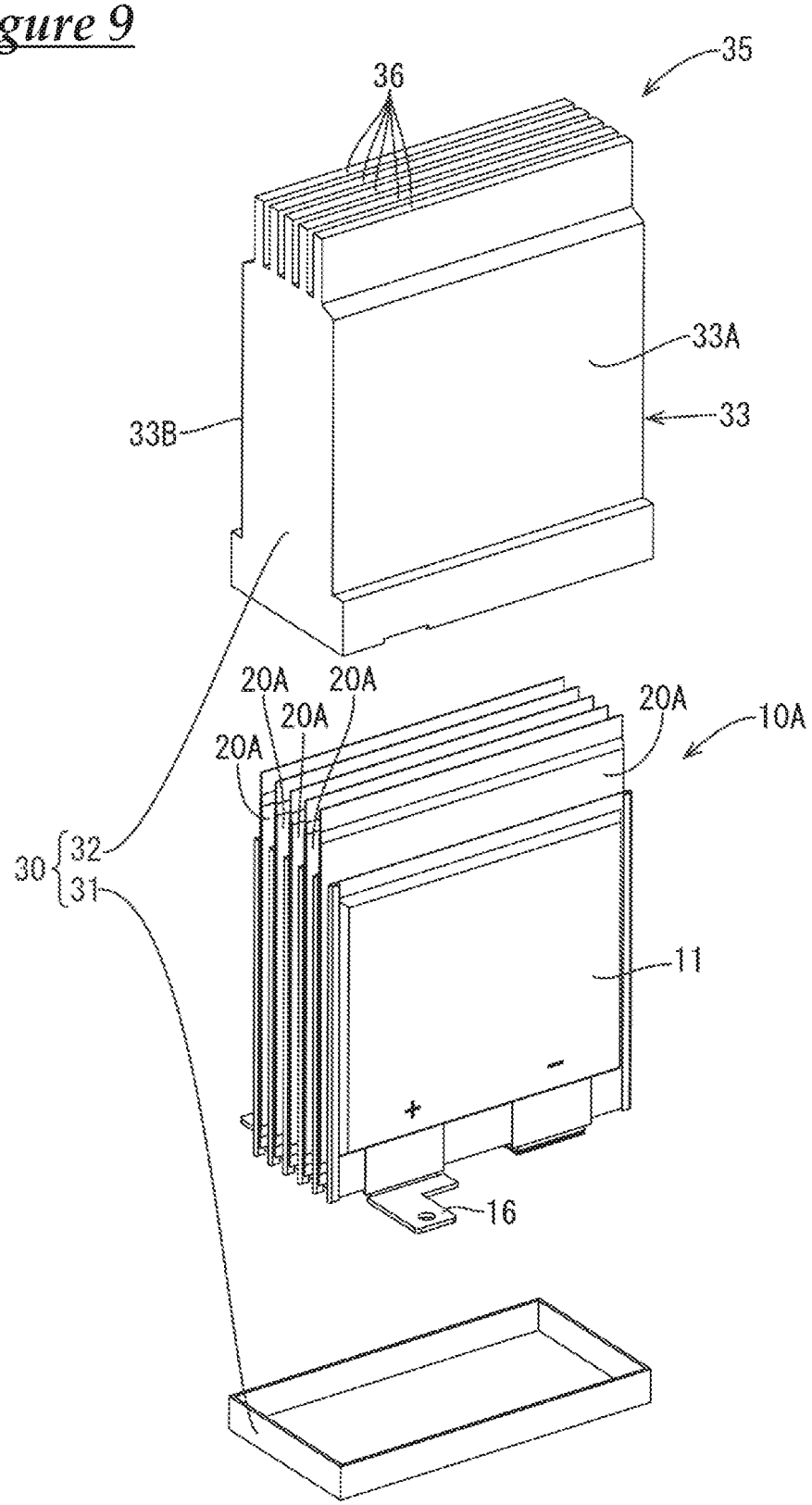
FIG. 9 is an exploded perspective view of the power storage module.
Figure 10:
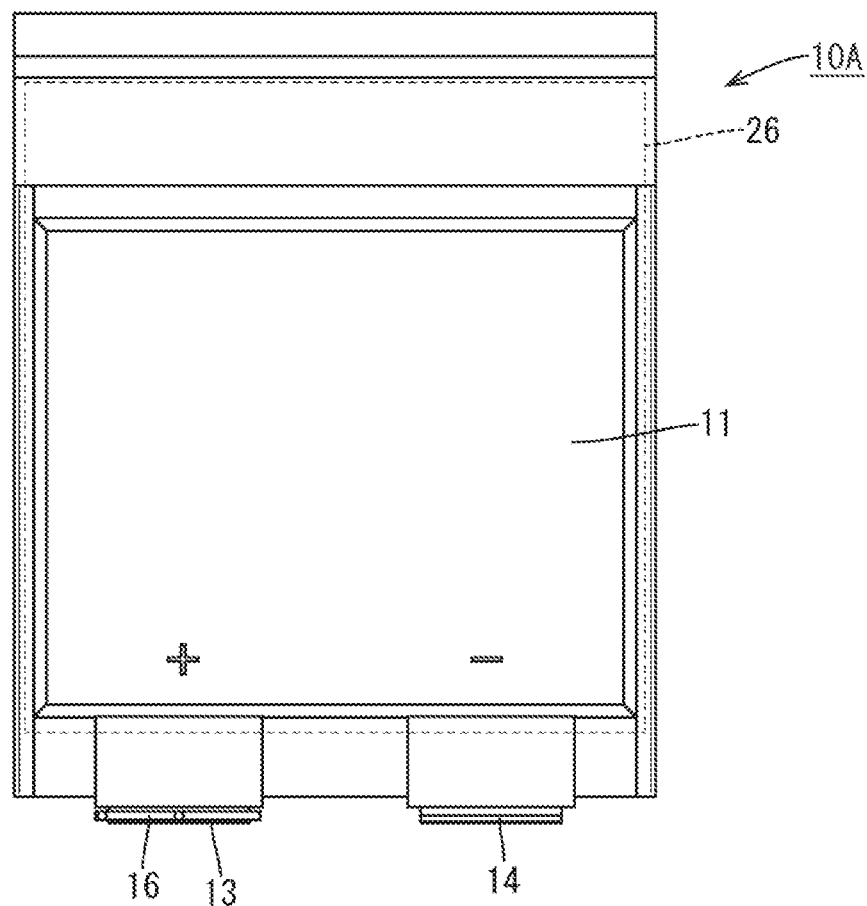
FIG. 10 is a front view illustrating a power storage element group.
Figure 11:
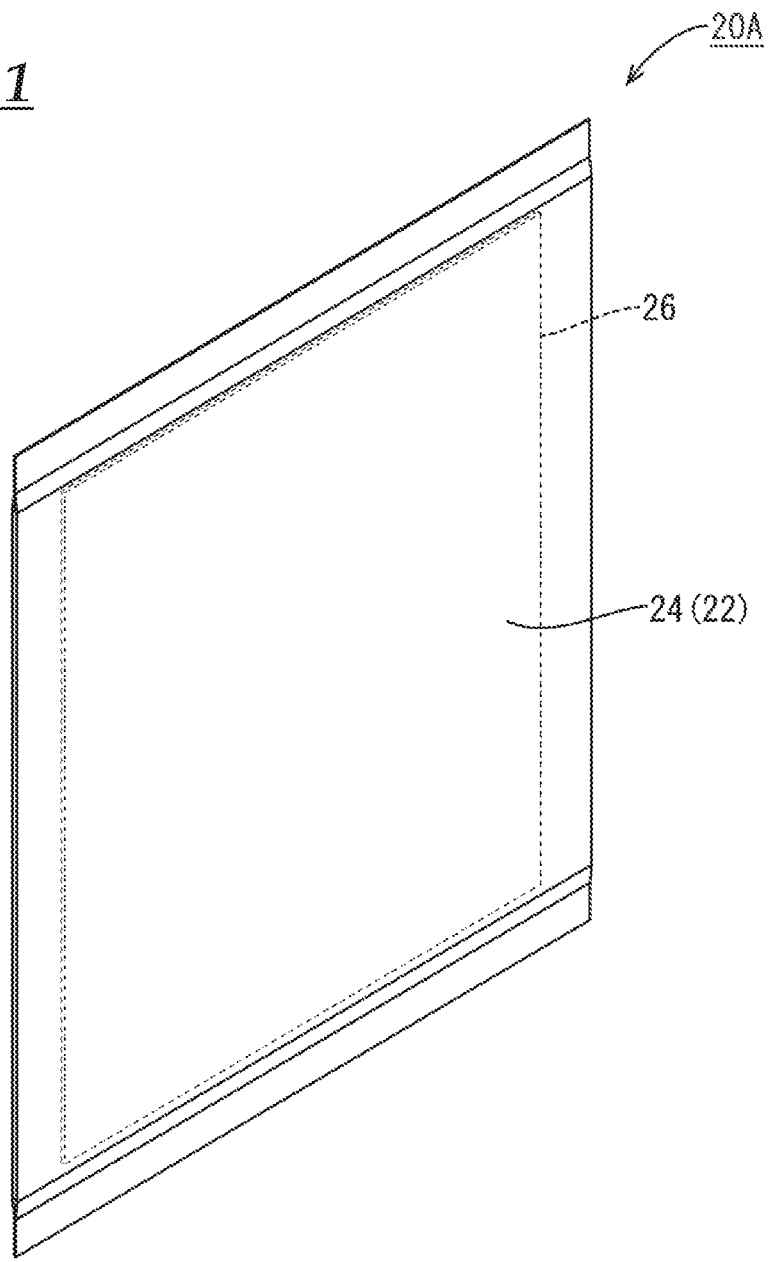
FIG. 11 is a perspective view illustrating a heat transfer pack.

As illustrated in FIG. 9, the casing 30 covers a whole of the power storage element group 10A and includes a lower case 31 having a substantially rectangular shape and an upper case 32 attached to the lower case 31 on an upper side. The upper case 32 includes a main body 33 having a square tube shape covering side surfaces of the power storage element group 10A, and the heat releasing section 35 disposed on an upper side with respect to the main body 33 (an upper side with respect to the upper case 32). The heat releasing section 35 has a large surface area. The main body 33 includes a front surface portion 33A and a rear surface portion 33B and inner surfaces of the front surface portion 33A and the rear surface portion 33B are contacted with the surfaces of the power storage elements 11.

As illustrated in FIG. 7, the heat releasing section 35 includes heat releasing fins 36 (five in this embodiment) that are disposed at equal intervals. Each of the heat releasing fins 36 has the recessed section 37 therein (in an inner section thereof) and an end portion (of the enclosing member 22) of the heat transfer pack 20A is inserted in the recessed section 37. The recessed sections 37 are arranged at equal intervals according to the positions of the heat transfer packs 20A and open downwardly. A dimension of the space inside the recessed section 37 (a distance between opposing walls of the recessed section 37 in an arrangement direction of the recessed sections 37) is greater than a thickness of the heat transfer pack 20A having low inner pressure. The heat of the power storage element 11 is transferred to the heat transfer pack 20A that is contacted with the power storage element 11 and the refrigerant 21 is vaporized and the inner pressure of the enclosing member 22 is increased such that the spread section 25 spreads as illustrated in FIG. 5. Accordingly, the outer surfaces of the sheet members 23, 24 are contacted with the inner wall surfaces of the recessed section 37 in a surface contact state such that the heat of the enclosing member 22 is transferred to the heat releasing section 35 and released from the heat releasing section 35 to the external space.

The lower case 31 and the upper case 32 are made of material having high heat transfer properties and that may be metal such as aluminum, aluminum alloy, copper, and copper alloy. The lower case 31 and the upper case 32 may be made of the same material or different materials. The heat releasing section 35 of the casing 30 may be formed from material having high heat transfer properties and portions of the casing 30 other than the heat releasing section 35 may be formed from material different from that of the heat releasing section 35. The lower case 31 and the upper case 32 may be connected with a known method such as laser welding, brazing, a locking structure including a locking member and an locked member, a screwing structure, and bonding with adhesive. In this embodiment, the lower case 31 and the upper case 32 are not connected in a liquid tight manner. However, they may be connected in a liquid tight manner.

According to this embodiment, following operations and effects are obtained.

The cooling member 20 includes the refrigerant 21, the absorbing member 26 absorbing the refrigerant 21, the enclosing member 22, and the heat releasing section 35. The enclosing member 22 includes the sheet members 23, 24 having flexibility that are bonded to each other and enclose the refrigerant 21 and the absorbing member 26 in a sealed state therebetween. The heat releasing section 35 receives the heat from the enclosing member 22 and releases the heat to the outside.

According to this embodiment, the pressure inside the enclosing member 22 is increased by the evaporation of the refrigerant 21. Then, the sheet members 23, 24 having flexibility are deformed to increase the volume of the enclosing member 22 and the pressure within the enclosing member 22 is lowered. Accordingly, pressure resistance of the enclosing member 22 can be lowered compared to the cooling member 20 including a metal container that does not change its volume. Therefore, a manufacturing cost of the cooling member 20 is reduced. The heat transferred from the power storage element 11 to the enclosing member 22 is released via the heat releasing section 35. The heat releasing properties can be improved.

The heat releasing section 35 includes the recessed sections 37 in which the ends of the enclosing members 22 are inserted.

Accordingly, the inner wall surfaces of each recessed section 37 of the heat releasing section 35 are opposite the outer surfaces of the end portion of each enclosing member 22 such that an area of the heat releasing section 35 receiving the heat from the enclosing member 22 is increased. This improves heat releasing properties.

The power storage module 10 includes the cooling member 20 and the power storage element 11. At least a part of an outer surface of the power storage element 11 is in contact with the cooling member 20.

According to such a configuration, the heat of the power storage element 11 of the power storage module 10 can be released via the heat releasing section 35.

The power storage element 11 is arranged in the casing 30 and the inner surface of the casing 30 is in contact with the outer surface of the power storage element 11 and the heat releasing section 35 is arranged in the casing 30.

According to such a configuration, the heat of the power storage element 11 of the power storage module 10 is released via the casing 30.

Second Embodiment

A second embodiment will be described with reference to FIGS. 13 to 18. The heat releasing section 50 of the first embodiment is a natural air cooling type device. A heat releasing section 50 of the second embodiment is a water cooling type device. Hereinafter, configurations same as those of the first embodiment have the same numerals or symbols and will not be described.

Figure 15:
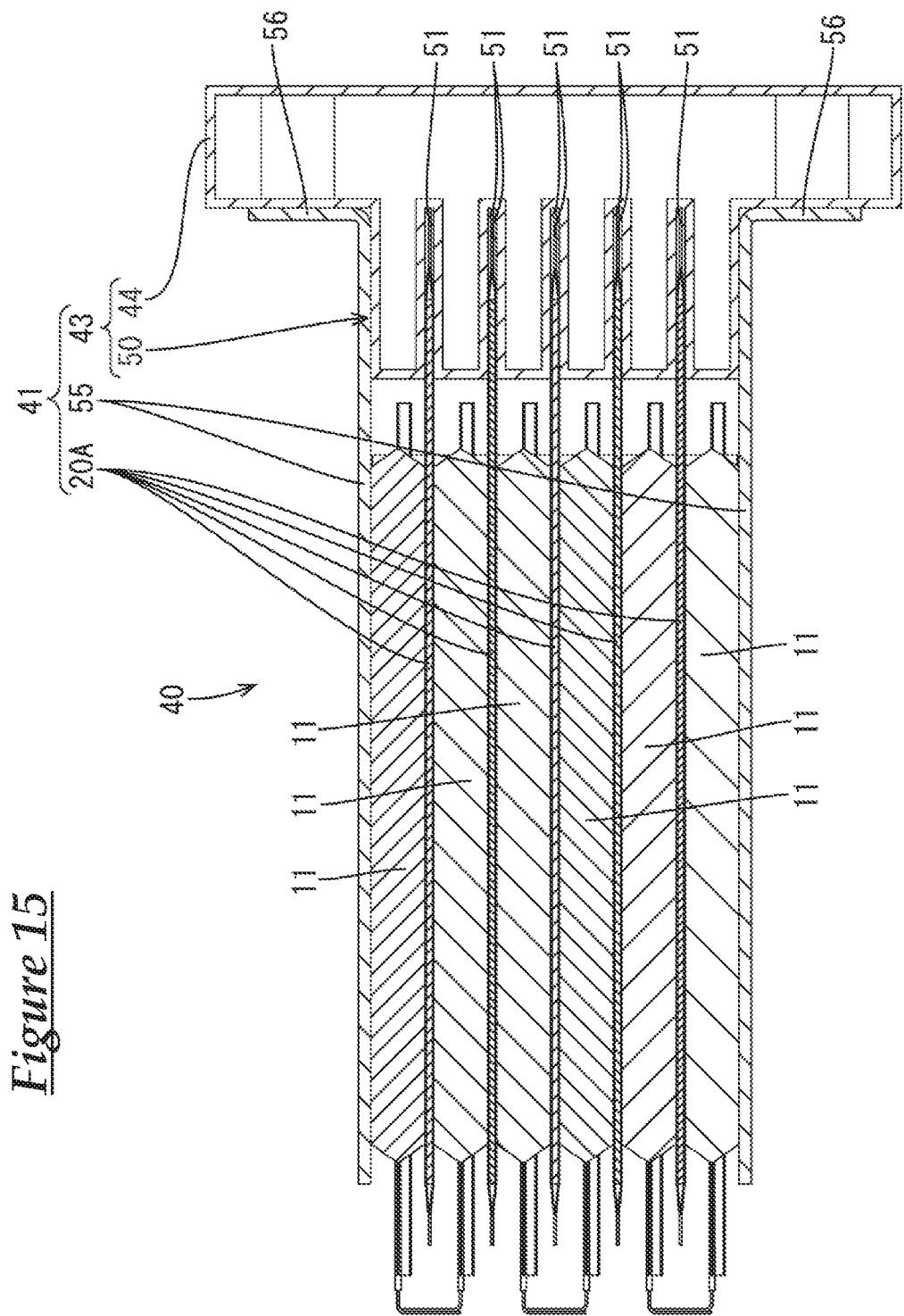
FIG. 15 is a cross-sectional view taken along line D-D in FIG. 14.

As illustrated in FIG. 15, a power storage module 40 includes the power storage elements 11 (six in this embodiment) and a cooling member 41 cooling the power storage elements 11.

The cooling member 41 includes the heat transfer packs 20A, a jacket section 43 that receives heat from the heat transfer packs 20A and releases the heat to the outside, and a pair of holding plates 55 that hold the power storage element group 10A herebetween.

Figure 13:
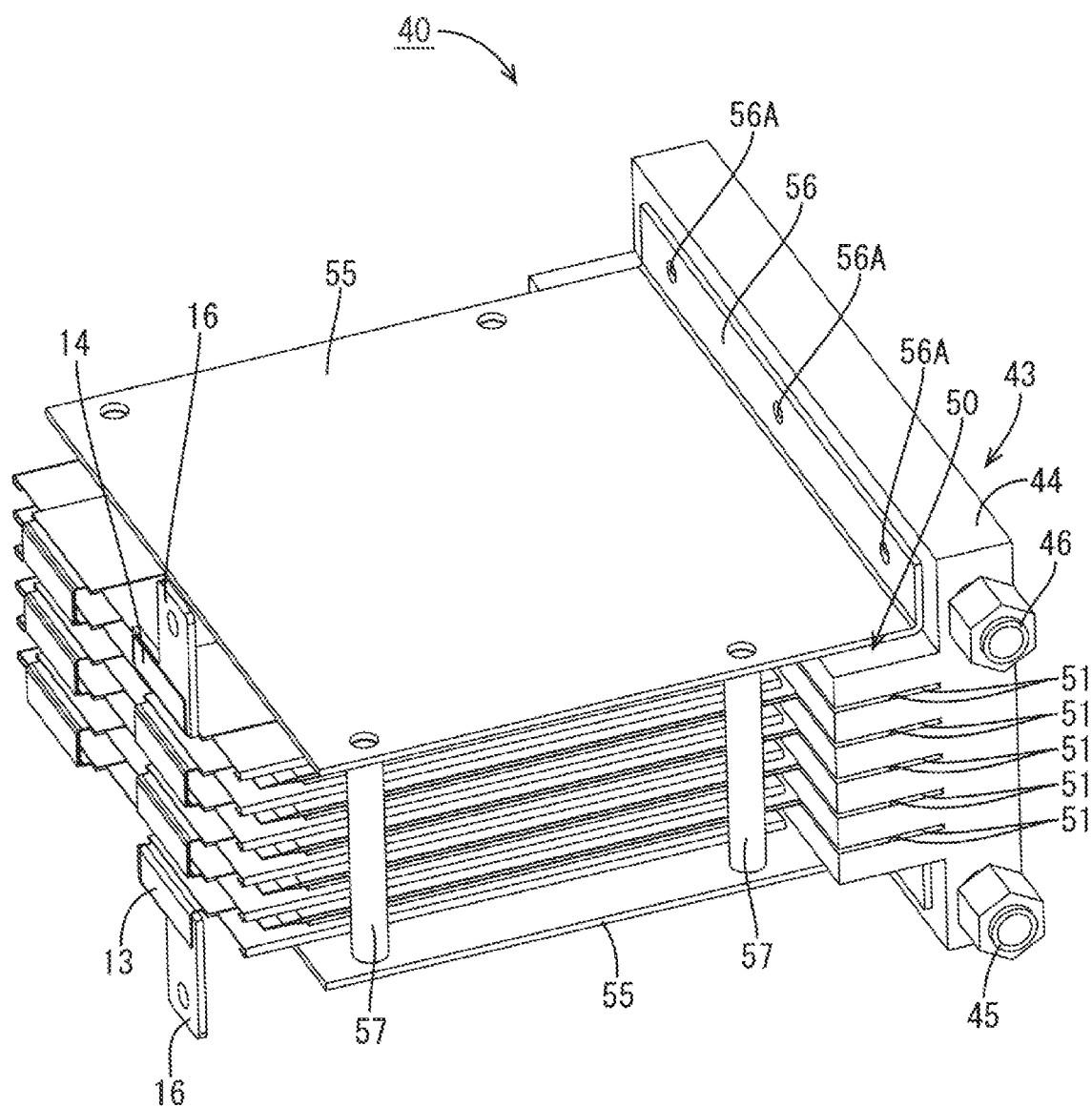
FIG. 13 is a perspective view illustrating a power storage module according to a second embodiment.
Figure 14:
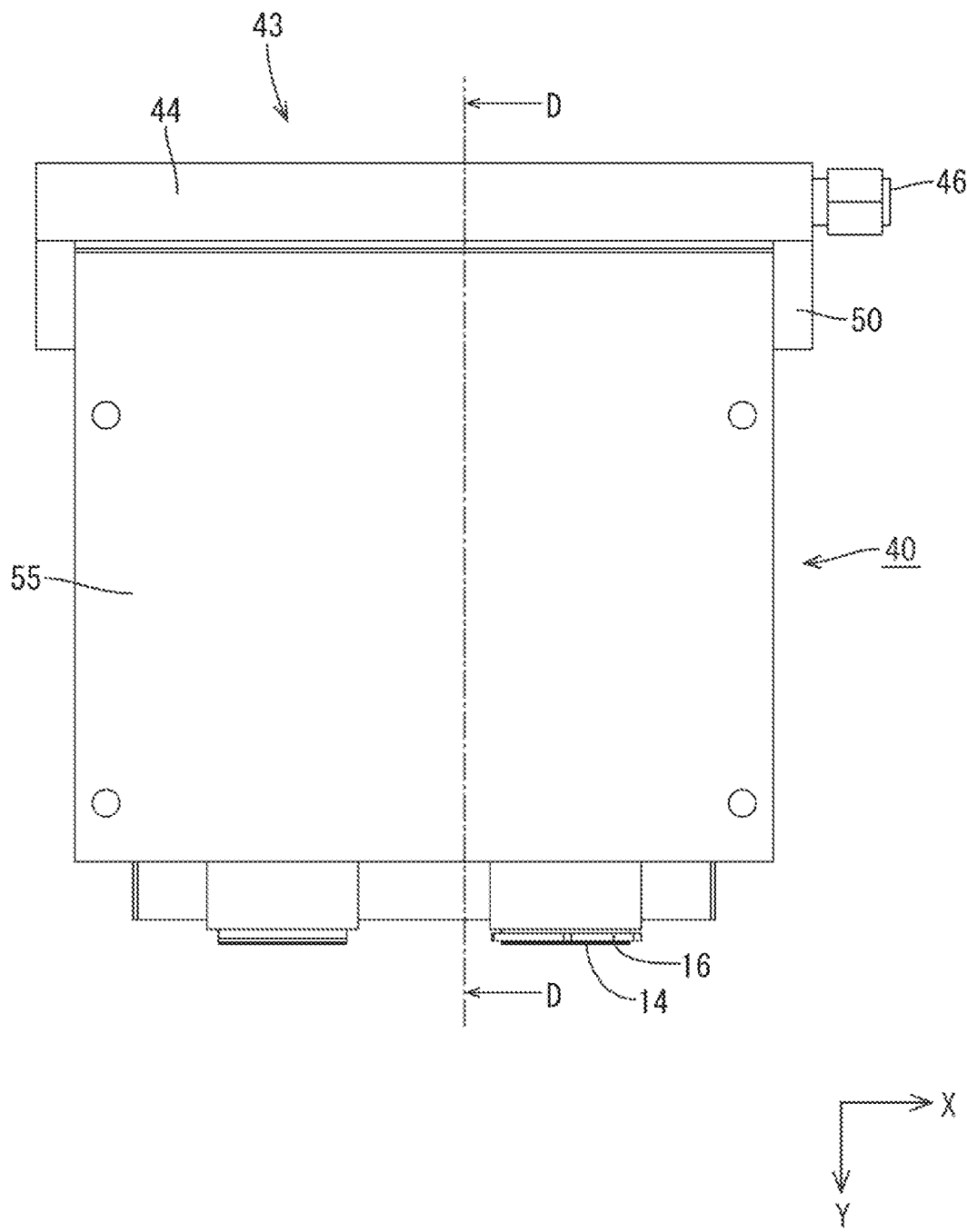
FIG. 14 is a plan view illustrating the power storage module.

The jacket section 43 is made of metal such as aluminum and aluminum alloy, and includes a base section 44 and the heat releasing section 50 that cools end portions of the heat transfer packs 20A. A pipe (not illustrated) in which coolant flows is folded several times and extends in an entire inner space of the jacket section 43. The pipe extends inside the base section 44. The pipe may also extend in an inner space of the heat releasing section 50 where no recessed section 51 is provided. As illustrated in FIG. 13, the base section 44 has an inlet 45 and an outlet 46 for the coolant. The coolant enters through the inlet 45 on an lower side and discharged through the outlet 46 on an upper side. The coolant is thus circulated through a heat releasing path (not illustrated) and the heat transferred to the coolant is released to the outside. In this embodiment, water is used as the coolant. However, it is not limited thereto and liquid such as oil may used as the coolant. The liquid is not necessarily used as the coolant but gas may be used as the coolant. Antifreeze may be used as the coolant.

The heat releasing section 50 includes the recessed sections 51 in which ends portions (of the enclosing member 22) of the heat transfer packs 20A is inserted. The recessed sections 51 are arranged at equal intervals according to the positions of the heat transfer packs 20A. If the refrigerant 21 is vaporized and the enclosing member 22 is expanded, the sheet members 23, 24 are contacted with the walls of each recessed section 51 and the heat is transferred from the enclosing member 22 to the heat releasing section 50.

Figure 16:
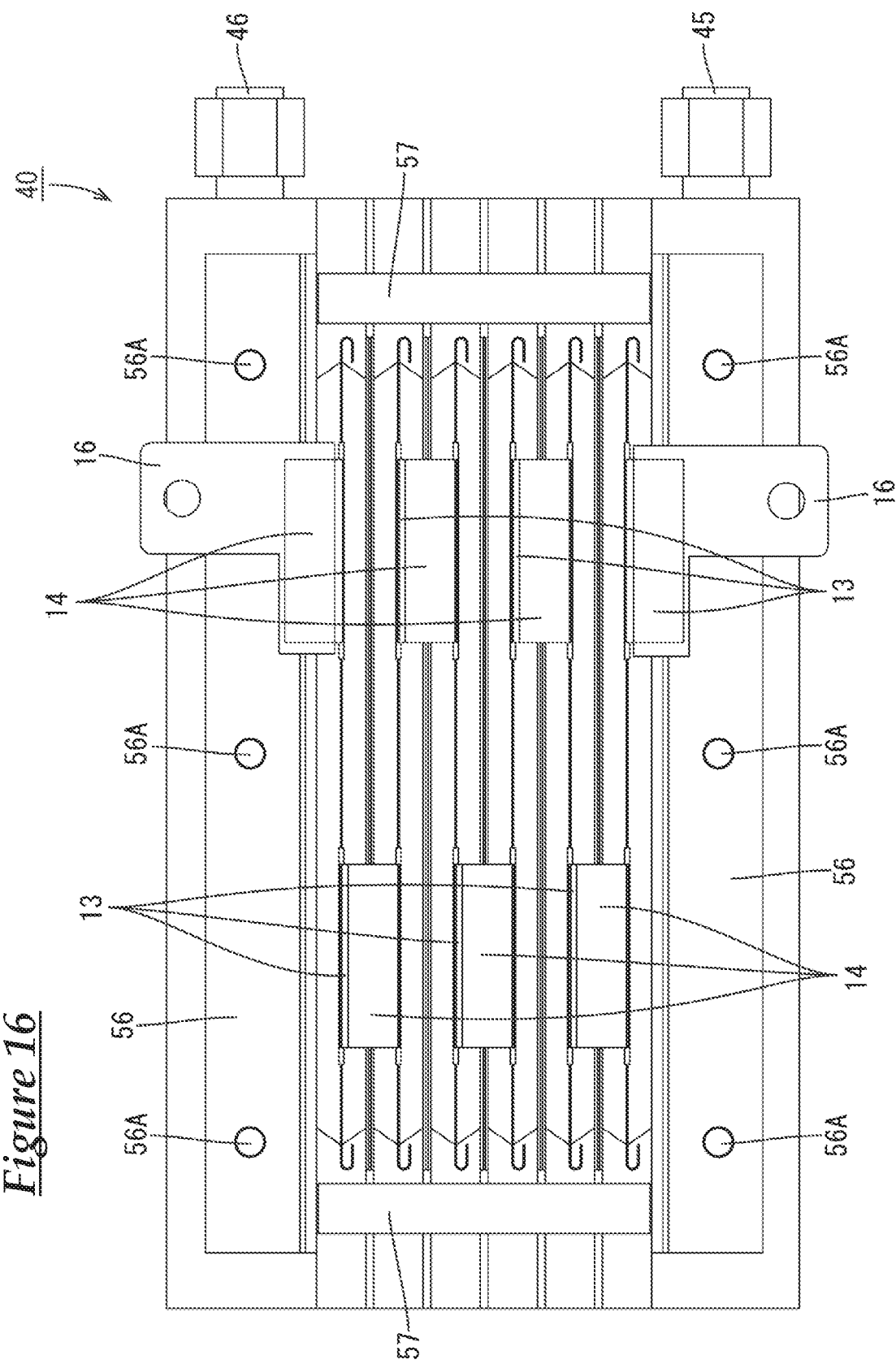
FIG. 16 is a front view illustrating the power storage module.
Figure 17:
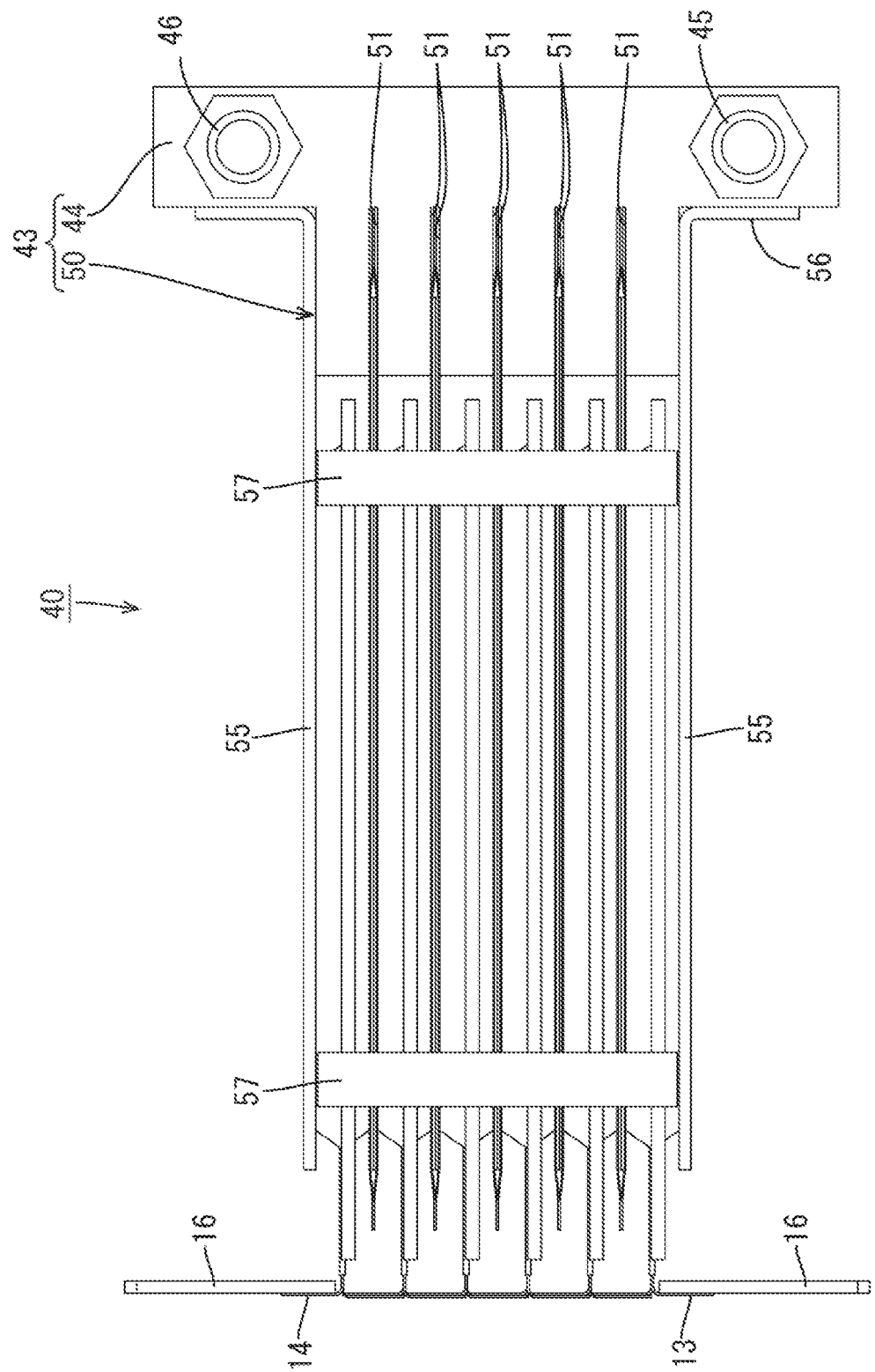
FIG. 17 is a side view illustrating the power storage module.
Figure 18:
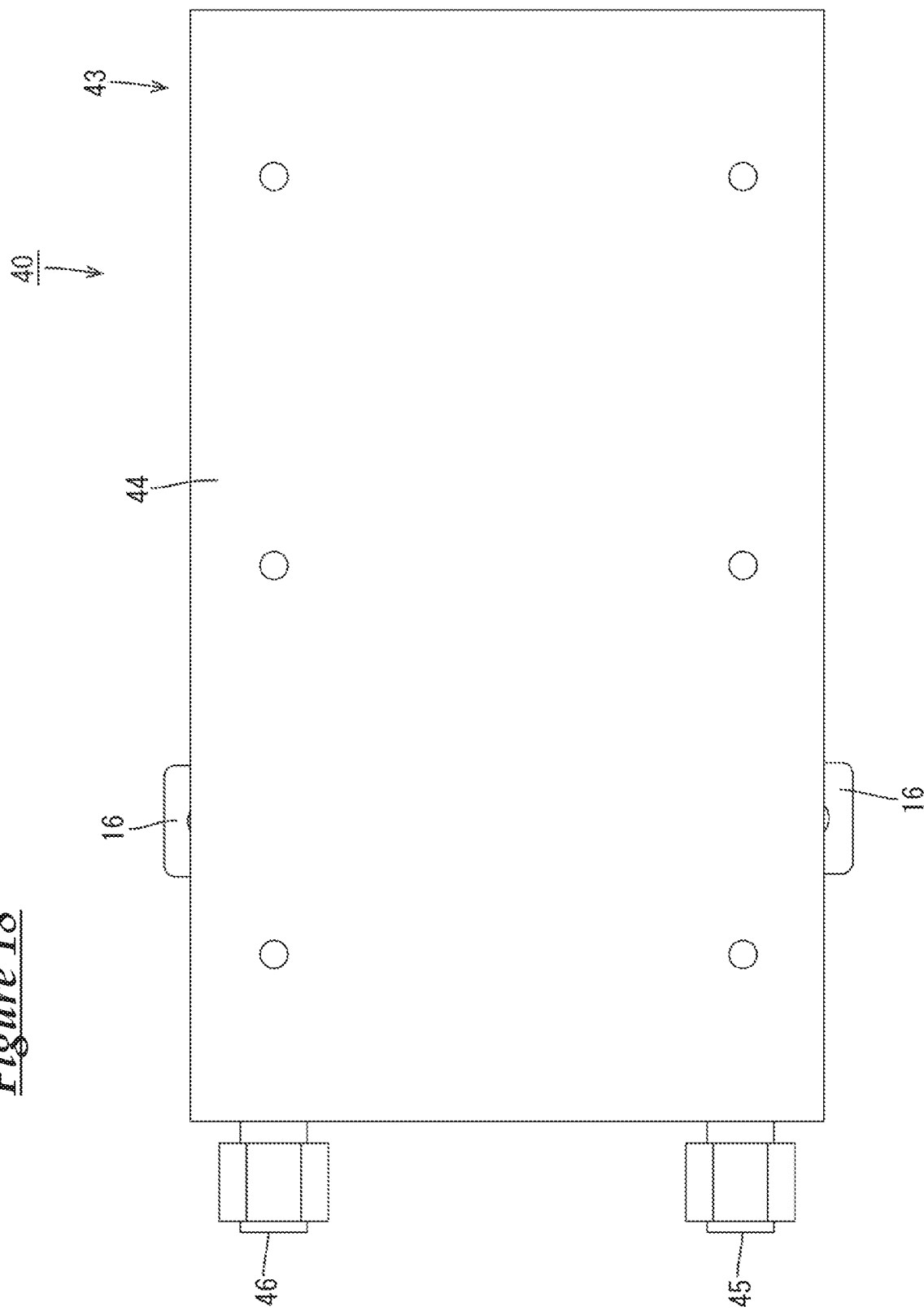
FIG. 18 is a rear view illustrating the power storage module.

The pair of holding plates 55 are formed from metal plates of aluminum, aluminum alloy, copper, and copper alloy. As illustrated in FIGS. 13 and 16, each of the holding plates 55 includes a bent portion 56 at an end thereof. The bent portion 56 is bent in an L-shape and fixed to a heat releasing section 50 side surface of the base section 44 with known fixing means 56A such as welding or screwing. The holding plates 55 are connected to each other via connecting members 57 at left and right edge portions thereof. The connecting member 57 is formed in a columnar post shape.

According to such a configuration, heat of the outermost power storage elements 11 of the power storage element group 10A is transferred to the holding plates 55. Then, the heat is further transferred to the jacket section 43. Heat of each power storage element 11 is transferred through the heat transfer pack 20A to the jacket section 43 and released to the outside.

According to the second embodiment, the heat releasing section 50 releases heat to the outside via the circulation of gas or liquid.

Accordingly, the heat releasing properties of the heat releasing section 50 is improved.

The holding plates 55 hold the power storage elements 11 and the heat transfer packs 20A that is included in the cooling member 41 while being in contact with the outer surfaces of the power storage elements 11.

According to such a configuration, the heat of the power storage elements 11 can be released from the heat releasing section 50 via the holding plates 55.

Other Embodiments

The present technology described in this specification is not limited to the embodiments, which have been described using the foregoing descriptions and the drawings. For example, embodiments described below are also included in the technical scope of the present technology described in this specification.

The sheet members 23, 24 are not limited to the laminating films but may be formed from metal sheets.

The cooling members 20, 41 of the above embodiments are included in the power storage module 10, 40. However, it is not limited thereto and the cooling members 20, 41 may be used in any heat generating devices such as electric connectors or electronic control units (ECU).

In the above embodiments, the enclosing member 22 includes two sheet members 23, 24 that are connected to each other. However, it is not limited thereto and the enclosing member 22 may be formed from one sheet member. The sheet member may be folded and edges thereof may be connected in a liquid tight manner to form the enclosing member 22. Three or more sheet members may be connected in a liquid tight manner to form the enclosing member 22.

The heat releasing sections 35, 50 may be a forced air-cooling type device in which the power storage element is forcibly cooled by a fan.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

EXPLANATION OF SYMBOLS 10, 40: power storage module
11: power storage element
20, 41: cooling member
21: refrigerant
22: enclosing member
23, 24: sheet member
26: absorbing member
30: casing
35, 50: heat releasing section
36: heat releasing fin
37, 51: recessed section
55: holding plate

The invention claimed is:

1. A cooling member comprising:
refrigerant that changes between gas and liquid;
an absorbing member absorbing the refrigerant;
an enclosing member including flexible sheet members that are connected to each other and configured to enclose the refrigerant and the absorbing member in a sealed state; and
a heat releasing section configured to receive heat from the enclosing member and release the heat to an outside, wherein
the heat releasing section includes a recessed section in which an end portion of the enclosing member is inserted and having opposing walls, and a space of the recessed section is defined between the opposing walls, and
a distance between the opposing walls of the recessed section is greater than a thickness of the enclosing member, and when an inner pressure of the enclosing member increases due to vaporization of the refrigerant, the enclosing member deforms such that the flexible sheet members are forced away from one another so as to contact, or increase contact with, the opposing walls of the recessed section.

2. The cooling member according to claim 1, wherein the heat releasing section releases heat to an outside via circulation of gas or liquid.

3. A power storage module comprising:
the cooling member according to claim 1; and
a power storage element having an outer surface, wherein at least a part of the outer surface is in contact with the cooling member.

4. The power storage module according to claim 3, further comprising a casing in which the power storage element is arranged and having an inner surface that is in contact with the outer surface of the power storage element, wherein the heat releasing section is included in the casing.

5. The power storage module according to claim 3, further comprising a pair of holding plates that hold the power storage element therebetween while being in contact with the outer surface of the power storage element, and the pair of holding plates being in contact with the heat releasing section.

6. The cooling member according to claim 1, wherein the flexible sheet members have a spread section at a connection section where ends of the flexible sheet members are connected to each other and the flexible sheet members are folded at the ends thereof at the spread section.

7. The cooling member according to claim 6, wherein when the inner pressure of the enclosing member increases due to vaporization of the refrigerant, the spread section of the flexible sheet members deforms such that outer surfaces of the flexible sheet members are contacted with the two opposing walls of the recessed section in a surface-contact state, respectively.

8. The cooling member according to claim 1, wherein the flexible sheet members are spaced away from the two opposing walls of the recessed section, respectively.

9. A cooling member comprising:
refrigerant that changes between gas and liquid;
an absorbing member absorbing the refrigerant;
an enclosing member including flexible sheet members that are directly connected to each other and configured to enclose the refrigerant and the absorbing member in a sealed state; and
a heat releasing section configured to receive heat from the enclosing member and release the heat to an outside, wherein
the heat releasing section includes a recessed section in which an end portion of the enclosing member is inserted and having a first opposing wall and a second opposing wall that opposes the first opposing wall, and a space of the recessed section is defined between the first opposing wall and the second opposing wall, and
a distance between the first opposing wall and the second opposing wall of the recessed section is greater than a thickness of the enclosing member, and when an inner pressure of the enclosing member increases due to vaporization of the refrigerant, the enclosing member deforms such that the flexible sheet members are forced away from one another so as to contact, or increase contact with, the first opposing wall and the second opposing wall of the recessed section.

10. The cooling member according to claim 9, wherein the heat releasing section releases heat to an outside via circulation of gas or liquid.

11. A power storage module comprising:
the cooling member according to claim 9; and
a power storage element having an outer surface, wherein at least a part of the outer surface is in contact with the cooling member.

12. The power storage module according to claim 11, further comprising a casing in which the power storage element is arranged and having an inner surface that is in contact with the outer surface of the power storage element, wherein
the heat releasing section is included in the casing.

13. The power storage module according to claim 11, further comprising a pair of holding plates that hold the power storage element therebetween while being in contact with the outer surface of the power storage element, and the pair of holding plates being in contact with the heat releasing section.

14. The cooling member according to claim 9, wherein the flexible sheet members have a spread section at a connection section where ends of the flexible sheet members are connected to each other and the flexible sheet members are folded at the ends thereof at the spread section.

15. The cooling member according to claim 14, wherein when the inner pressure of the enclosing member increases due to vaporization of the refrigerant, the spread section of the flexible sheet members deforms such that outer surfaces of the flexible sheet members are contacted with the first opposing wall and the second opposing wall of the recessed section in a surface-contact state, respectively.

16. The cooling member according to claim 9, wherein the flexible sheet members are spaced away from the first opposing wall and the second opposing wall of the recessed section, respectively.

17. A cooling member comprising:
refrigerant that changes between gas and liquid;
an absorbing member absorbing the refrigerant;
an enclosing member including flexible sheet members that are connected to each other and configured to enclose the refrigerant and the absorbing member in a sealed state; and
a heat releasing section including two opposing walls that define a recessed section having a space between the two opposing walls, the recessed section receiving end portions of the flexible sheet members therein, the end portions of the flexible sheet members being connected to each other, the heat releasing section being configured to receive heat from the enclosing member and release the heat to an outside,
the two opposing walls of the recessed section being spaced from each other and having a distance therebetween that is greater than a thickness of the enclosing member including the flexible sheet members, the absorbing member, and the refrigerant, wherein
when an inner pressure of the enclosing member increases due to vaporization of the refrigerant, the enclosing member deforms such that the flexible sheet members are forced away from one another so as to contact the two opposing walls of the recessed section, respectively.

18. The cooling member according to claim 17, wherein the flexible sheet members have a spread section at a connection section where ends of the flexible sheet members are connected to each other and the flexible sheet members are folded at the ends thereof at the spread section.

19. The cooling member according to claim 18, wherein when the inner pressure of the enclosing member increases due to vaporization of the refrigerant, the spread section of the flexible sheet members deforms such that outer surfaces of the flexible sheet members are contacted with the two opposing walls of the recessed section in a surface-contact state, respectively.

20. The cooling member according to claim 17, wherein the flexible sheet members are spaced away from the two opposing walls of the recessed section, respectively.

* * * * *